US010011332B2

(12) United States Patent
Michalski

(10) Patent No.: US 10,011,332 B2
(45) Date of Patent: Jul. 3, 2018

(54) MODULAR ELECTRONIC ACTIVATION SYSTEM

(71) Applicant: Bogdan Michalski, Hawkesbury (CA)

(72) Inventor: Bogdan Michalski, Hawkesbury (CA)

( * ) Notice: Subject to any disclaimer, the term of this patent is extended or adjusted under 35 U.S.C. 154(b) by 0 days.

(21) Appl. No.: 14/660,705

(22) Filed: Mar. 17, 2015

(65) Prior Publication Data

US 2017/0029081 A1 Feb. 2, 2017

(51) Int. Cl.

*B63C 9/19* (2006.01)
*G05D 7/06* (2006.01)
*F17C 1/00* (2006.01)
*F17C 7/00* (2006.01)
*B63C 9/00* (2006.01)

(52) U.S. Cl.

CPC .................. *B63C 9/19* (2013.01); *F17C 1/00* (2013.01); *F17C 1/005* (2013.01); *F17C 7/00* (2013.01); *B63C 2009/007* (2013.01); *F17C 2201/0109* (2013.01); *F17C 2201/058* (2013.01); *F17C 2205/032* (2013.01); *F17C 2221/013* (2013.01); *F17C 2250/032* (2013.01); *F17C 2250/034* (2013.01); *F17C 2265/04* (2013.01); *F17C 2265/06* (2013.01); *F17C 2270/0772* (2013.01)

(58) Field of Classification Search

CPC ................. B63C 9/19; B63C 2009/007; F17C 2270/0772; F04B 33/005; A62B 99/00

USPC ...... 441/93, 90, 94, 41, 81, 80, 89; 141/330, 141/38; 220/3, 5, 541.2; 417/549; 455/404.1

See application file for complete search history.

(56) References Cited

U.S. PATENT DOCUMENTS 1,704,944 A * 3/1929 Johann ................. A62C 35/605 137/68.3
2,506,983 A * 5/1950 Williams ............... G08B 17/04 116/106
2,894,658 A * 7/1959 Spidy ......................... B63C 9/24 222/5
3,180,524 A * 4/1965 Shepart ..................... B63C 9/24 137/72
3,266,668 A * 8/1966 Davis ......................... B63C 9/24 137/67

(Continued)

*Primary Examiner* — Jason K Niesz
*Assistant Examiner* — James Hakomaki
(74) *Attorney, Agent, or Firm* — Brion Raffoul

(57) ABSTRACT

This invention discloses an inflator mechanism for rafts and life vests that performs a multitude of functions required for rescue and underwater deployment of personnel and devices. The inner cylinder in this disclosure is actuated by a plethora of inputs, manual, automatic selectable pressure sensing, or dualled hydrostatic sensors which can each be safely selected by function selection. Since the inflator uses spring discs to drive a penetrator which mechanically punctures a membrane of an inflation gas source and actuated by an electronically controlled solenoid, dissolvable elements, conductivity switches and preset check valve actuators are eliminated increasing the safety and reliability of the actuator. Electronic control further permits user enabling of inflation depth actuation and the multiple water sensors prevent failure of actuation due to splashes and humidity effects on sensors. The actuator mechanism is self cocking, indicates proper installation of gas source enables use of several gas source cylinders and is multiply reusable.

20 Claims, 14 Drawing Sheets

(56) References Cited

U.S. PATENT DOCUMENTS

| | | | | | |
|---|---|---|---|---|---|
| 3,490,648 | A * | 1/1970 | Fujimoto | B63C 9/24 | 222/5 |
| 3,494,506 | A * | 2/1970 | Fujimoto | F16K 15/20 | 222/5 |
| 3,526,339 | A * | 9/1970 | Bernhardt | B63C 9/24 | 222/5 |
| 4,702,715 | A * | 10/1987 | Winick | B63C 9/0005 | 441/30 |
| 4,721,486 | A * | 1/1988 | Goettel | B63C 7/26 | 251/294 |
| 5,035,345 | A * | 7/1991 | Janko | B63C 9/24 | 222/41 |
| 5,628,350 | A * | 5/1997 | Gibb | B60S 5/043 | 141/19 |
| 5,732,752 | A * | 3/1998 | Glessner | B63C 9/20 | 116/210 |
| 6,290,476 | B1 * | 9/2001 | Wu | F04B 33/005 | 417/549 |
| 6,439,941 | B2 * | 8/2002 | McClure | B63C 9/0005 | 441/89 |
| 6,561,863 | B1 * | 5/2003 | Campbell | B63C 9/24 | 441/10 |
| 6,837,245 | B2 * | 1/2005 | Matheny | A62B 9/02 | 128/205.21 |
| 8,494,480 | B2 * | 7/2013 | Aschauer | A62B 99/00 | 455/352 |
| 8,613,637 | B2 * | 12/2013 | Puls | B63C 9/0005 | 441/80 |
| 8,826,931 | B2 * | 9/2014 | Clark | B63C 9/19 | 137/81.2 |
| 2006/0035622 | A1 * | 2/2006 | Kampel | A63B 29/021 | 455/404.2 |
| 2007/0123121 | A1 * | 5/2007 | Quintero | B63C 9/0005 | 441/6 |
| 2010/0015867 | A1 * | 1/2010 | Betz | B63C 9/1255 | 441/92 |
| 2012/0073466 | A1 * | 3/2012 | Wang | F04B 33/005 | 102/530 |
| 2012/0217263 | A1 * | 8/2012 | Becnel | B63C 9/19 | 222/5 |
| 2013/0210297 | A1 * | 8/2013 | Maas | B63C 9/19 | 441/95 |
| 2014/0308860 | A1 * | 10/2014 | Marshall | B63C 9/1255 | 441/89 |

* cited by examiner

MODULAR ELECTRONIC ACTIVATION SYSTEM

TECHNICAL FIELD

The present invention relates to the field of inflators. More specifically, this invention relates to a modular electronic activation system for an inflator.

BACKGROUND

An unmet market exists for a high performance inflator used in life vests and similar marine and rescue applications. Inflators are used in a multitude of operations where the safety of life and equipment is threatened due to sinking in water or bogs. In general, the inflator is attached to personal flotation devices (life vests), rafts, or flotation collars and, when activated, fills the bladders of this equipment with gas thus providing flotation.

At present, inflators are widely used in applications from casual boating to rescue and special force attack situations. The consumer market is vast—some type of life vest is required for every boater, cruise passenger and marine sports enthusiast. The majority of life vests are bulky, static, and contain flotation fillers such that they are inherently buoyant, but an increasing number of upper-end vests in this market use compact $CO_2$ cartridges as an inflation means. These upper-end life vests are filled by manual action or by an automatic action, generally based upon the dissolution of a soluble pellet impeding the penetration action of a plunger that breaks a gas cartridge seal to release inflation gas ($CO_2$). Some upper-end vests actuate after receiving an electrical conductivity signal as the inflator is wetted.

The common use of a soluble pellet as a trigger component has serious flaws. Water must be able to reach and dissolve the pellet but, if water enters at the wrong time, inflation can cause mobility problems and can destroy the usefulness of the vest. The pellet is also a single use product requiring replacement of the entire inflation mechanism after a single use. With a water and humidity sensitive trigger, reliability is also called into question. The pellet is also sensitive to low temperature, where it freezes, thus preventing inflation of the vest when needed.

The use of conductivity is also a problem because wet surfaces and/or unplanned wetting may trigger inflation. While conductivity of water is good at sea, fresh water creates problems due to high resistivity of the water.

A 400 volt high voltage sensor is used in a few applications but the high voltage is difficult to use safely. Accidental water infiltration and shorting of the mechanism is an unconquered problem. Development in this area does indicate a real need for a reliable inflator with advanced features.

At present, inflators tend to be bulky due to use of compressed coil springs. Therefore, there is a need for a better powering of the penetrator motion that is less bulky.

To increase power of the penetrator motion, in most units, a new spring of higher rating is needed. Therefore, there is a need for easily adjustable spring force in inflators.

Too many inflators are subject to inadvertent inflation due to accidental infiltration of water into the mechanism and the resulting dissolution of the penetrator motion blocking pellet causing inappropriate inflation. This needs a cure.

When wet, too many inflators are triggered and inflate even if the wetting is temporary or from a wave, etc. Therefore, there is a need for redundancy with prevention of inadvertent inflation in water triggered inflation.

In drops, in deep diving, and other rescue operations, inflation at or just above the surface may allow the life vest or inflation collar to be blown from the target. Therefore, there is a need for an easily set depth of inflation underwater. Such a settable inflator could prevent loss of life due to narcosis for example.

SUMMARY

This invention provides an inflator system with controls that may be triggered by manual, moisture or depth signals from a compact controller. The device further provides disc springs powering a penetrator with either simple impact forces and/or rotary forces to efficiently penetrate the sealing membranes of a compressed gas cylinder allowing gas inflation of a bladder. Use of dual moisture sensors, and adjustable pressure activation in addition to manual actuation allows maximum utility. The mechanism and controls are totally reusable while disc springs provide critical reduction in size.

This invention provides an activation system concept that provides freedom from the presently predominant soluble pellet triggered inflation mechanism, replacing the pellet with an electro-mechanical inflation control that is easily reusable, reliable and precise. The inflator may be triggered by manual action, automatic release, or by hydrostatic pressure.

In a first aspect, this document discloses an inflator mechanism, the mechanism comprising:

- a penetrator for piercing a membrane of a gas bottle;
- at least one disc spring for propelling said penetrator toward said membrane;
- a restraining pin for restraining said penetrator; wherein
- said at least one disc spring is compressed when said penetrator is restrained by said restraining pin;
- when said restraining pin is removed, said penetrator is released and is propelled to pierce said membrane;
- when said membrane is pierced, inflation gas escapes from said gas bottle; and
- when said penetrator is released, said penetrator undergoes a rotary motion as said penetrator advances towards said membrane.

BRIEF DESCRIPTION OF DRAWINGS

The embodiments of the present invention will now be described by reference to the following figures.

DETAILED DESCRIPTION

The usage of accurate full featured inflators such as disclosed herein is a niche area and most likely will be used in rescue, air drop, and military applications. The settable depth of inflation disclosed will aid in air drops of equipment and supplies into water. The ability to set a depth for triggering inflation is important to prevent damage to the inflation bags and to prevent early inflation which could misdirect drop loads.

The electro-mechanical inflator system herein is easily reusable, unlike many other units on the market. The versatility of the product, despite the limited niche usage indicates a real need for this device.

The inflator disclosed herein provides a rapid inflation of either a primary inflation vest or float, or provides the input pressure to enable the penetration of a secondary, much larger flotation collar, vest, or other flotation device.

The prior art was deficient in providing for easily pre-set depth of inflation. The pressure switched electronic control on this inflator cures this problem.

Prior art use of dissolvable pellets was both slow and subject to premature inflation if the inflator was accidentally wetted. The inflator of the present invention has dual moisture sensors that both need to contact water to provide a signal and thus is much harder to trigger premature inflation by casual wetting.

Prior art has not recognized the need for a controllable depth set point prior to initiation of inflation. This inflator has electronically selectable depth requirements prior to inflation, making it useful in remote unmanned air drops, as well as for better control of personnel inflation methods.

The present invention uses disc springs, which provide tight control over the force of penetrator action without adding bulk. The result is a very compact inflator size.

In one design of the inflator, opening of the compressed gas cylinder by the penetrator is further enhanced by a rotary action, providing a wider opening in the gas cylinder allowing faster gas flow.

The electro-mechanical inflator consists of a small electronic controller and a penetrator housed in a fixed housing. The penetrator is powered by sets of disc springs. The inflator has—a controller with a manual bypass and at least one of moisture or pressure sensors, which will permit the motion of the penetrator.

Figure 1:
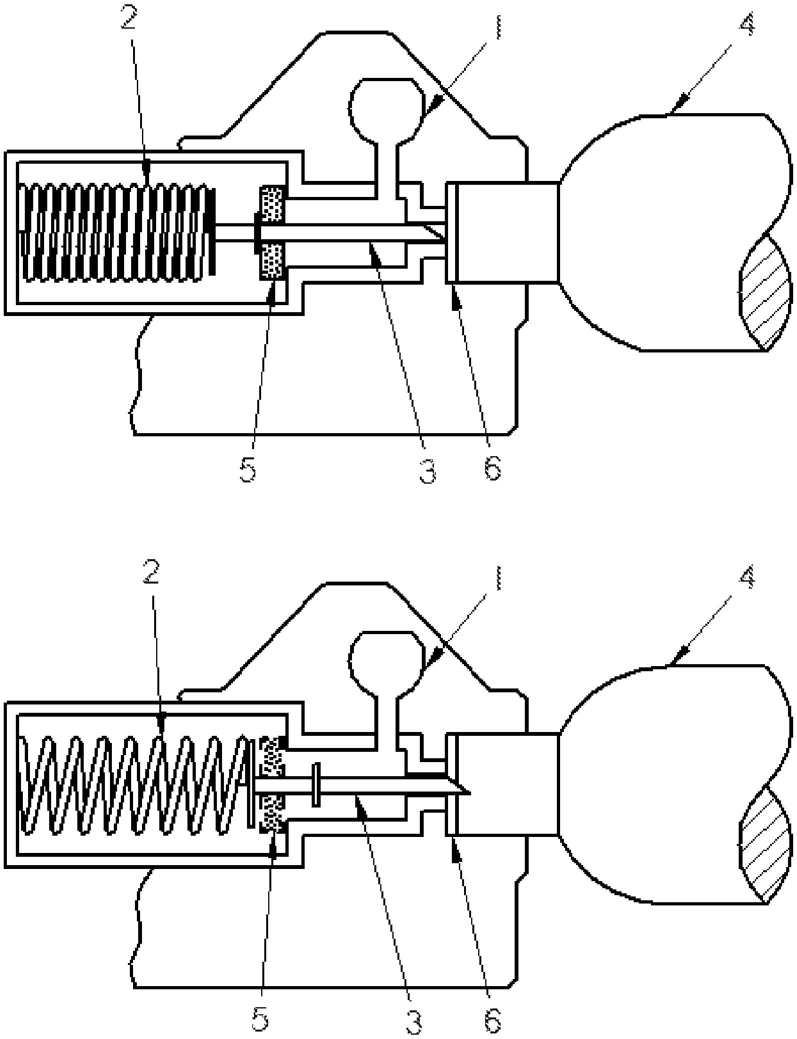
FIGURE 1 PRIOR ART
FIG. 1 shows a typical inflator according current practice.

The methods of operation of this electro-mechanical inflator are provided below. The electro-mechanical inflator is attached to a bladder of an inflatable device by any well-known manifold valve. A well-known example of such a manifold valve is shown in FIG. 1.

This manifold valve 1 is permanently attached to the inflatable bladder. A coil spring 2 powers a penetrator 3, with the forward motion of the penetrator towards the gas cartridge 4 being restricted by soluble pellet 5. The UL1191 standard controls the gas flow characteristics. When a hole is pierced in the sealing membrane 6 of a $CO_2$ cartridge 4, the inflator delivers gas through the manifold 1 to inflate the bladder. A minimum of 30 to 50 pounds of force is needed to pierce the cartridge membrane. Usually each size cartridge requires a separate manifold but this new inflator will be capable of handling both ⅜ inch and ½ inch cartridges, a feature not currently available.

The inflator is designed to operate in all mounting positions, which adds to its usability in a variety of applications.

When the inflator function is set to manual, the following actions below will take place. The operator pulls a lanyard attached to the inflator's internal parts. This triggers the instantaneous release of the piercing pin. However, the important aspect of pulling is the maximum force required by the UL1191 standard, which is set to 15 lbs. Most of the inflators on the market are designed to have this force just under the required 15 lbs. The present invention offers a lower pulling force than the 15 lbs required by the prior art since its lever permits a leverage ratio of 4 or more, which can be beneficial to the users in some situations. Additionally, this required pulling force magnitude can be factory adjusted in the range from 5 lbs to 15 lbs, which can be beneficial for the users in some situations, i.e. in arctic operations where the strength of the human body diminishes rapidly in sub-zero temperatures.

The manual function of the inflator can be used at any time, regardless of whether the device is in manual, hydrostatic or automatic mode. The manual function simply overrides all other settings in any situation. An instantaneous inflation feature also applies to all functions (manual, automatic and hydrostatic) of the inflator.

While the manual function is an absolute requirement for the inflator, one key feature that sets this inflator apart from its competitors is the automatic function. Specifically, the automatic function mimics the water contact function of other inflators, without relying on soluble pills.

When the device control function is switched to automatic, the following actions will take place:

(i) Upon the contact with the water, the sensor will detect whether the inflator is submerged fully into the water.

(ii) Two independent probes, located on opposite upper and lower sides of the inflator, must be fully submerged in the water to close the electric circuit and thereby allow advancement of the penetrator. This feature ensures that no inadvertent inflation will happen during accidental water splashes or rain. This feature of a dual sensor activation feature in an automatic inflator prevents most cases of splash activation of the inflator. Such a feature is not taught in the prior art.

(iii) Upon detecting water, a programmable microprocessor will send an "open!" command to the electronically operated trigger mechanism, to thereby release a piercing pin to pierce the gas bottle.

This action, between the moment of sensing the water and the moment of releasing the piercing pin, takes only a fraction of a second. This fast action feature is non-existent in any other inflator on the market today. Dissolvable pills require 3-4 seconds to release the pin. Other types of electrical inflators use capacitors that must be charged for 3-4 seconds before releasing the pin. This speed is a very significant improvement over other inflator mechanisms as the inflation time is crucial in life threatening situations. This feature may be useful in arctic conditions, where the gas passage channels inside of the inflator and manifold valve are subject to rapid freezing in cold water. Such conditions can restrict the flow of the gas through these channels.

In addition to the switchable automatic function, there is an additional hydrostatic function that can permit inflation at easily pre-set pressures so that the inflator will not inflate prematurely and so that the inflator can be inflated below the surface. This function works as detailed below and allows for the ultimate in adjustability.

When the inflator function is set to hydrostatic, the following actions will take place:

(i) Upon the contact with the water, the sensor will detect that inflator is submerged fully in the water.

(ii) Two independent probes, located on opposite upper and lower sides of the inflator, must be fully submerged in the water to close the electric current connection between, or within, dual probes. This feature ensures that no inadvertent inflation will happen during accidental water splashes or rain.

(iii) Upon detecting water, a warning sign of water detection is stored inside the microprocessor, but no action is taken. The microprocessor remains in alert mode, waiting for another signal from the pressure sensor.

(iv) When the inflator reaches a depth pre-set by the user, the microprocessor, which is constantly monitoring changes in the pressure, will send an "open!" command to the electronically operated trigger mechanism, thus instantaneously releasing a piercing pin and piercing the gas bottle. In this case of hydrostatic function, signals from both the water sensor and the pressure sensor must occur in order to initiate inflation.

The inflator may be used in a variety of other applications such as supply drops.

The inflator can also be used as an operating pilot valve for larger inflatable life saving devices, like life rafts, and aircraft emergency slides, rafts and flotation collars. These devices are equipped with large volume gas canisters that must fill the inflatable chambers of the life saving device in a very short time. They use large valves, which normally are activated by a manually operated lanyard. While this is a standard safety procedure for the situation, the raft, slide or collar can either sink if it is dislodged prior to inflation or blow away if it is not correctly tethered. The flotation device thus can become unusable if not equipped with some means of automatic inflation. This is even more evident in Search and Rescue operations, where rafts are most often dropped from fixed or rotary wing aircraft and should have a means of automatic inflation upon impact or submersion in the water given that the victims may not have either the strength or the knowledge of how to inflate the raft in the water.

This inflator, when operating as a pilot for a larger gas canister valve, is ideally suited for larger rafts and is easily dialed to automatic inflation when automatic inflation is desired, or in emergency back-up automatic mode, when the manual mode has failed.

This inflator can also be used in flotation aids attached to valuable or essential equipment, which may be potentially lost while operating around the water. Not susceptible to rain or water splashes, the inflator can even be attached to underwater or semi-submerged equipment when in hydrostatic mode and can safely bring sinking equipment back to the surface.

The hydrostatic mode for the inflator can also be used to counter narcosis by scuba divers or in case of accidental unconsciousness and subsequent sinking. For example, the hydrostatic mode set for a certain safety depth may bring the victim back to surface after reaching the specified depth during uncontrolled descent.

This inflator, being electronically operated, may be equipped with a Wi-Fi transmitter/receiver for remote operation, for example when the user may be unconscious. In this instance, an operator can inflate the vest from a distance to assist the user. In another embodiment, this feature may be also used in transmitting a distress signal, thus doubling the function of the inflator.

This inflator, having a microprocessor, may be configured to provide retrieval of the usage history, battery life and other technical and statistical information. This feature may be very useful during maintenance and repairs of the inflator.

The mechanical components of the new inflator provide improved functionality over the prior art. The dual water sensor array, the disc springs and the electromechanical or electronic control, which allows for selection of an activation depth, all act together to provide a smaller, improved system for inflation of safety bladders, life jackets or other safety equipment.

The present invention involving the inflator uses two parts: a mechanical device and a method of using this device through software or queued signals from the sensors contained within the inflation device.

In one implementation, the mechanical device part of this inflator comprises several key elements, which interact with each other in a specific sequence during a working cycle. There are four distinctive cycles that take place:

(i) Ready Cycle—the $CO_2$ bottle 22 is fully inserted into the ⅜" or ½" bottle port, and the triggering mechanism is in a working position with fully energized disc springs 28.

(ii) Activation Cycle—the triggering mechanism is unlocked by the electromechanical solenoid 23 and the piercing pin 24 moves forward to puncture the $CO_2$ bottle 22.

(iii) Idle Cycle—the $CO_2$ bottle 22 is removed from the inflator. The triggering mechanism is not energized, and all parts are idle.

(iv) Reloading Cycle—a new $CO_2$ bottle is inserted into the inflator, and the disc springs 28 of the trigger mechanism are moved to the Ready Cycle position.

Figure 12:
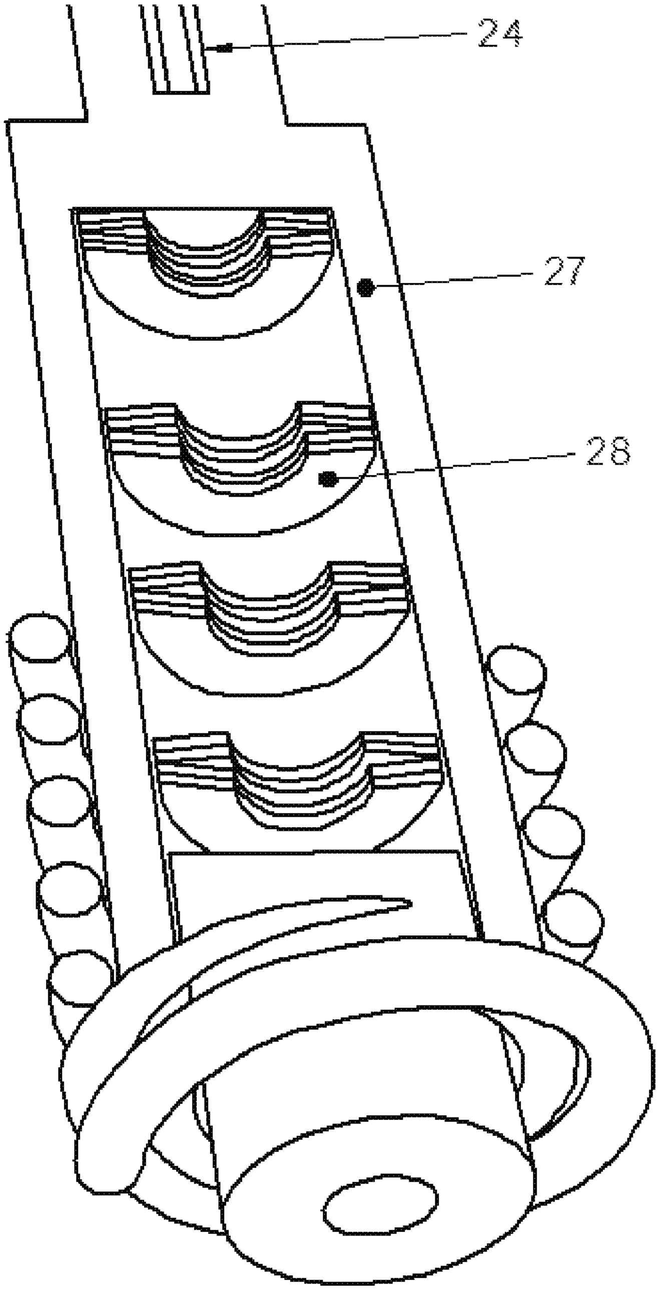
FIG. 12 shows an expanded view of the disc springs, each set spaced for clarity.

Critical to the above device and its method of operation is the use of disc springs. These springs, which can be ¾ inch or smaller in diameter, provide significant power when stacked. FIG. 12 shows disc springs 28 within the inner cylinder 27 powering the penetrating pin 24. It is noted for clarity that only alternate groups of springs are shown and that the entire space within the inner cylinder would be packed with opposing groups of disc springs in contact. When the springs are "cocked", they would be compressed by the tip of the gas cylinder as it is pressed into a loaded position.

These steps in loading the inflator are used in the manual mode (M) in the automatic action mode (A) or in the hydrostatic action mode (H). The combinations and properties of the constituent parts are described below.

Figure 2:
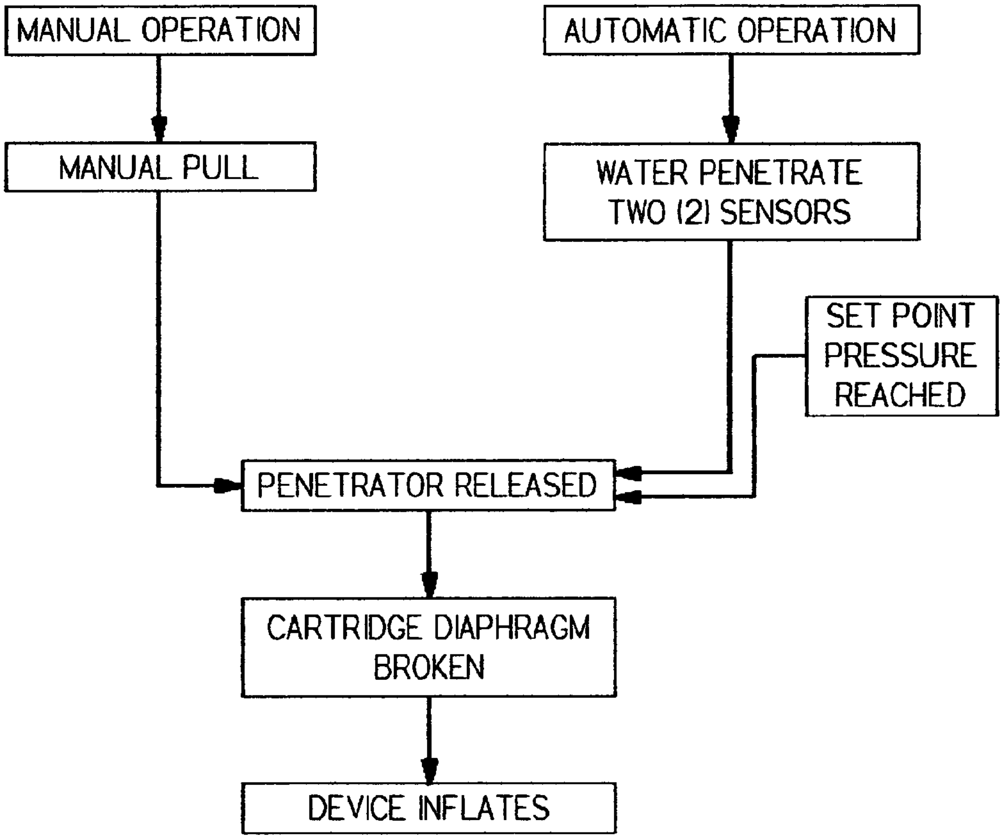
FIG. 2 shows a stepwise flow chart of the actions of the inflator in the present invention.

FIG. 2 shows the steps and pathways to achieve the inflation of a bladder. In manual operation, only the pull of the manual pull is required to release the penetrator through electronic or physical actions, depending on the mechanical and/or electronic layout of elements in the inflator.

FIG. 2 shows how water sensors are used in automatic mode. The penetrator is released when water penetrates and activates two sensors, as explained above.

FIG. 2 shows a third pathway for activation when a set pressure is reached. When the set pressure is reached, this triggers the mechanical or electrical release of the penetrator. It should be noted that additional pathways could be added, however these three paths are essential to full useful operation of the device.

Figure 3:
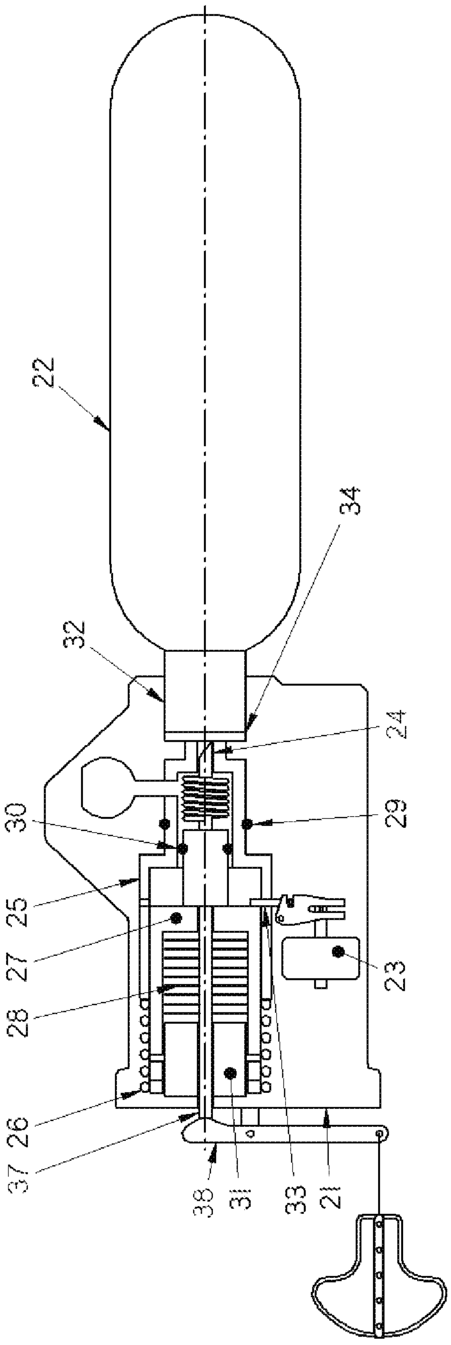
FIG. 3 shows the present inflator with a non-rotary piercing pin with the piercing pin in the pre-inflate position.

The key elements of the mechanical triggering mechanism shown in FIG. 3 are:

inflator housing 21
$CO_2$ bottle 22 with a sealing membrane 34
electromechanical solenoid 23
piercing pin 24
outer cylinder 25
spring, outer cylinder 26
inner cylinder 27
disc springs 28
O-ring, outer cylinder 29
O-ring, inner cylinder 30
stopper, inner cylinder 31

When the inflator is in the Ready Cycle, the $CO_2$ bottle 22 is fully inserted into the ⅜" or ½" bottle port 32. Disc springs 28 are fully energized or compressed inside the inner cylinder 27, and are held in compressed position by the pin 33 of the electromechanical solenoid 23.

This pin 33 can take any one of several forms. In its simplest form, the pin merely slips into a hole that crosses the outer cylinder 25 and either the piercing pin 24 or the body of the inner cylinder 27, the holes being aligned such that the travel of the piercing pin is prevented and the disc springs are in a "cocked" position under compression. The "cocked" position of the inner cylinder is actuated such that the inner cylinder is restrained by the pin 33, and by the insertion of a gas cylinder. However, it may also be manually cocked such as by manually restraining the inner cylinder and restraining it with the pin 33. The Activation Cycle starts when the pin 33 is retracted, either manually (in all modes—M, A, H) or automatically, when mode A (pressure activated) or H (hydrostatic actuation) is employed to remove the pin restraint.

When the inflator is ready to activate, it starts the Activation Cycle which triggers the following sequence:

(i) disc springs 28, which were previously compressed, expands to push forward the inner cylinder 27 with the attached piercing pin 24,
(ii) The piercing pin 24 rapidly moves forward and punctures the membrane 34 of the $CO_2$ bottle 22 with considerable force. This embodiment can achieve an estimated force of 70 lbs, by using seven sets of four disc springs that are 0.017 inch thick. This is more than twice the usual force provided in other inflation devices and is twice the force needed to puncture the membrane in $CO_2$ bottle 22.
(iii) The piercing pin 24 and inner cylinder 27 assembly in this preferred embodiment only travel a distance of 0.018 inches, and are stopped by the stopper 31. No other parts are moving at this point. The very short travel of the piercing pin and inner cylinder is a major benefit of the disc springs and permits a much smaller inflation activation device.
(iv) At this point, the gas, released by the puncturing the sealing membrane 34 of the $CO_2$ bottle 22, flows through the inside of the outer cylinder 25 to the gas channel in the inflator housing 21 and then to the pressure port connected with a manifold valve of the inflatable bladder. O-rings 29 and 30 prevent gas from leaking into the other areas of the inflator, thus preventing gas loss, and preventing sensitive electronic components from being immersed in rapidly expanding cold gas.

When the user is ready to remove a used $CO_2$ bottle 22, the device is in the Idle Cycle. The Idle Cycle uses the following sequence:

(i) Removing (unscrewing) $CO_2$ bottle 22 removes the constraint from outer cylinder 25 which starts to move forward, pushed by the outer cylinder spring 26. The outer cylinder travels only 0.138 inch distance and is stopped by the recess in the inflator housing 21.
(ii) The electromechanical solenoid pin travels with the outer cylinder 25. While traveling, the solenoid slides along the external surface of the inner cylinder 27, and is pushed back by its return spring to the forward position at the moment when sliding stops.
(iii) In this position, with the pin fully engaging the front surface of the inner cylinder 27, the inflator is ready to enter the next cycle.

The Reloading Cycle begins when the user is ready to insert a new $CO_2$ bottle 22. The Reloading Cycle initiates the following sequence:

(i) While screwing the $CO_2$ bottle 22 into the bottle port, using an average hand torque of 53 lb-in, the front of the bottle neck touches the front surface of the outer cylinder 25, which is located at a distance of 0.0138 inches from the ready position. Further torquing will move the outer cylinder 25 backwards until the $CO_2$ bottle 22 reaches the bottom of the bottle port,
(ii) Because the electromechanical solenoid 23 is permanently connected with the outer cylinder 25 and its pin is already engaged with the inner cylinder 27, the whole assembly comprising the $CO_2$ bottle 22, the outer cylinder 25, the solenoid 23, and the inner cylinder 27 moves backwards for a first 0.02 inch distance to eliminate the clearance between the elements. The assembly then moves a distance of approximately 0.118 inch until stopped by the stopper 31.
(iii) While travelling, the internal surface of the inner cylinder 27 compresses the series of disc springs 28 and the outer cylinder spring 26, thus energizing these springs to be prepared for a new Ready Cycle.

The electronic components of the inflator allow for the above mechanical operations. The inflator has a fully programmable electronic unit controlled by a miniature microprocessor via customized software.

The operational functions of the inflator, as discussed above, are:

Manual—all electronic control and functions are disabled
Automatic—activated upon full contact with water, pressure sensor is disabled
Hydrostatic—activated upon full contact with water and pressure sensor depth reading.

Figure 9:
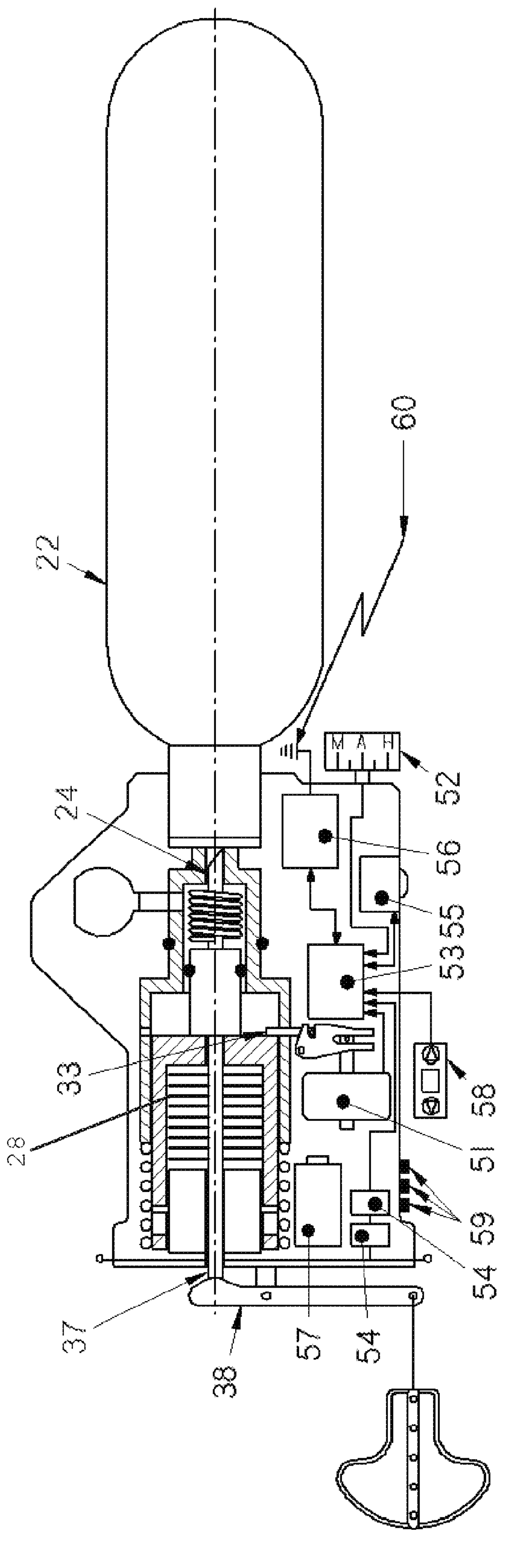
FIG. 9 shows the electronic components in a favored embodiment.
Figure 10:
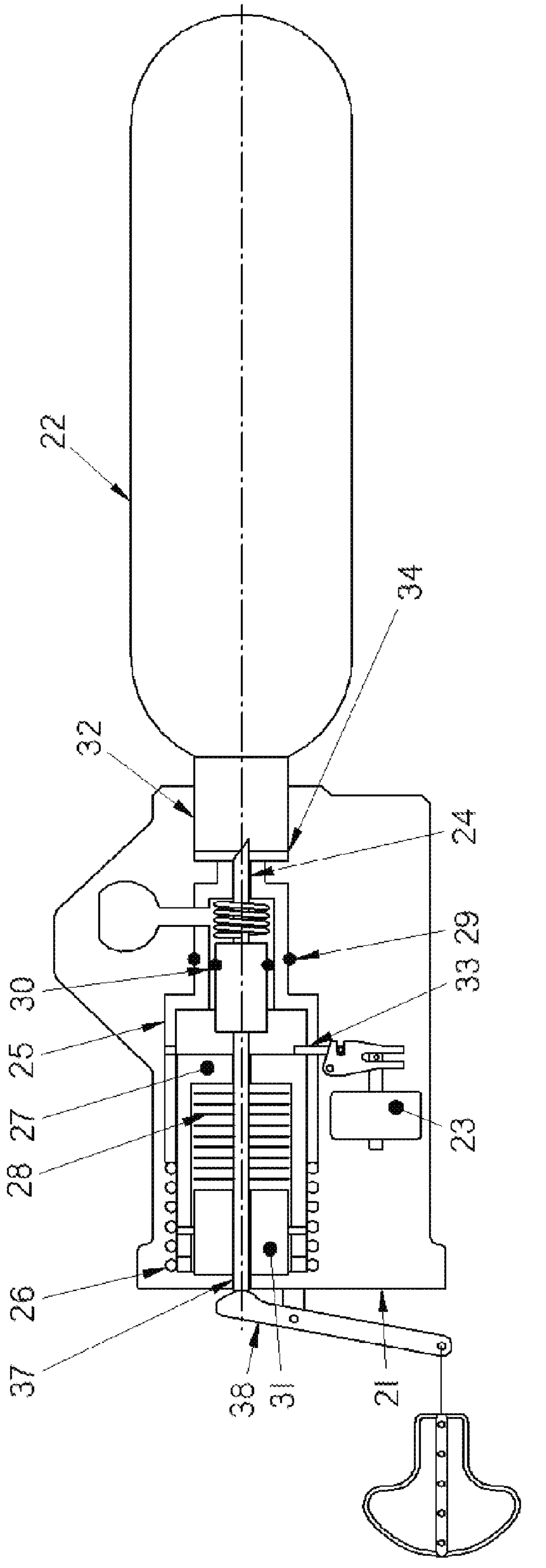
FIG. 10 shows another view of the inflator with an independently advanceable piercing pin actuated independently of the electronic spring actuation mechanism.

The key elements of the electronic assembly are shown in FIG. 9 and are:

electromechanical solenoid 51
two water sensors 54
pressure sensor 55
microprocessor 53
function selector 52
battery 57
optional Wi-Fi communication module 56
depth keypad 58
LED lights 59
optional remote inflate signal communication module 60.

When the inflator function is set to manual, the following actions will take place:

(i) All electronic controls and functions are disabled.
(ii) When the manual pull is used, the electromechanical solenoid 51 pin and/or the lever 38 is pulled by the pushing rod 37 and piercing pin 24, which pierces a hole in the membrane of the cartridge 22 and is moved away from the triggering mechanism, thus activating the inflator.

(iii) The microprocessor 53 is active and collecting data.

When the inflator function is set to automatic, the following action will take place:

(i) When inflator is submerged such that both water sensors 54 are under water, the signal from the sensor is received by microprocessor 53 which in turn sends a signal to the solenoid 51 to energize the solenoid coil.

(ii) The spring return pin 33 then moves away from the triggering mechanism, thus activating the inflator.

When only one water sensor 54 is under water, or when both probes are detecting water, but the water does not close the DC circuit, which occurs during rain or water splashes, the microprocessor 53 will not activate solenoid 51. When the inflator function is set to hydrostatic, the following actions will take place:

(i) All actions from automatic mode are applied (ii) Settings must be made on depth keypad 58.

(iii) The pressure sensor 55 continuously monitors the water pressure.

(iv) When the water sensors 54 are activated and the inflator reaches the set depth, the signal from the water sensors 54 and pressure sensor 55 is received by the microprocessor 53, which sends the signal to the solenoid 51 to energize the solenoid coil.

(v) The spring return pin moves away from the triggering mechanism, thus activating the inflator.

Regardless of the settings of the inflator, the inflator can always be triggered by manual action by pulling the lever 38 which actuates a sequence resulting in a piercing of the cartridge.

All settings are confirmed by a sequence of blinking LED lights 59 for period of 5 seconds. One of the lights also confirms that the $CO_2$ bottle is seated securely into the bottle port.

All of the components described and shown above are diagrammatic and in the preferred embodiment are housed within a durable engineering plastic shell.

FIG. 3 shows the inflator in a preferred “cocked” configuration. The disc springs 28 are compressed and the pin 33 is holding the inner cylinder back, thus preventing the penetration of the gas cylinder membrane 34.

Figure 4:
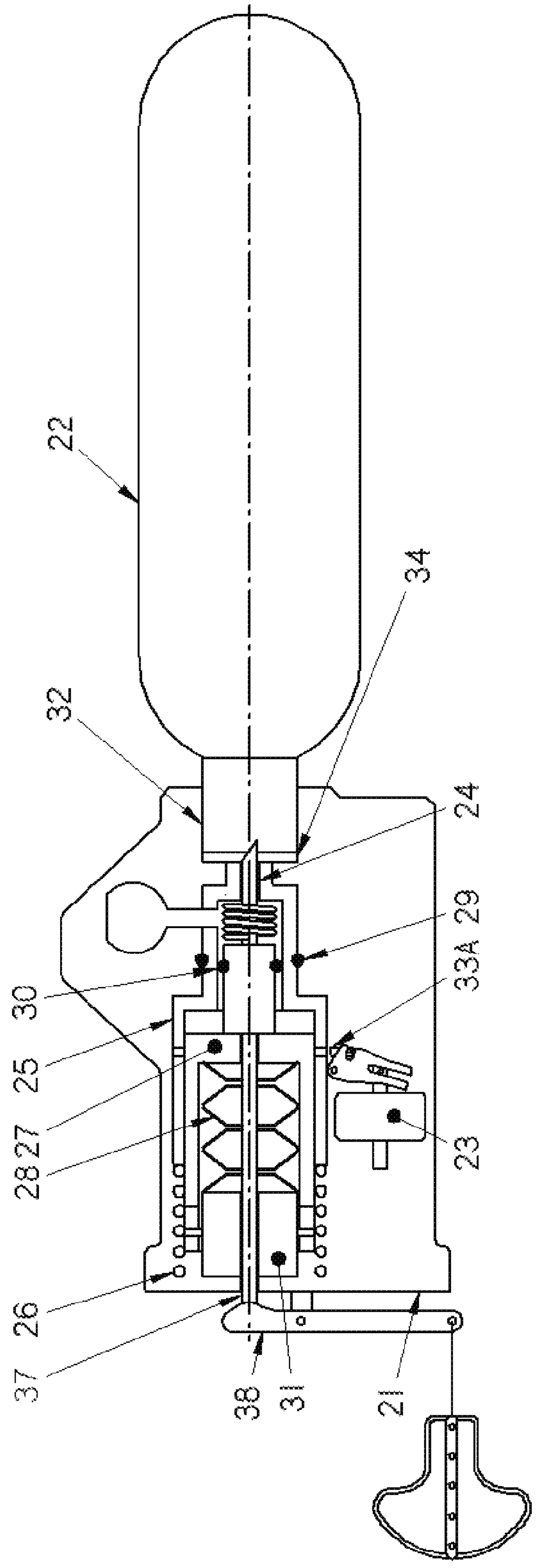
FIG. 4 shows the inflator of FIG. 3 with the piercing pin released by removal of the retaining pin, with the inner body thrust forward through the membrane of the $CO_2$ bottle.

FIG. 4 shows the same components as FIG. 3, but the inflator has been activated. The pin 33A is pulled out and thus no longer restrains the motion of the inner cylinder and the penetrating pin. As a result, the disc springs have driven the penetrating pin 24 through the cylinder membrane 34 into cylinder 22, and the gas has been released to fill an inflation bladder (not shown).

In a second embodiment, all of the above features are incorporated with an additional feature: remote operation via Wi-Fi or other communication module 56. When a remote operator sends the “Inflate” signal from a wireless hand held device, all settings on the board of the inflator are overridden, and the inflator is activated.

Figure 5:
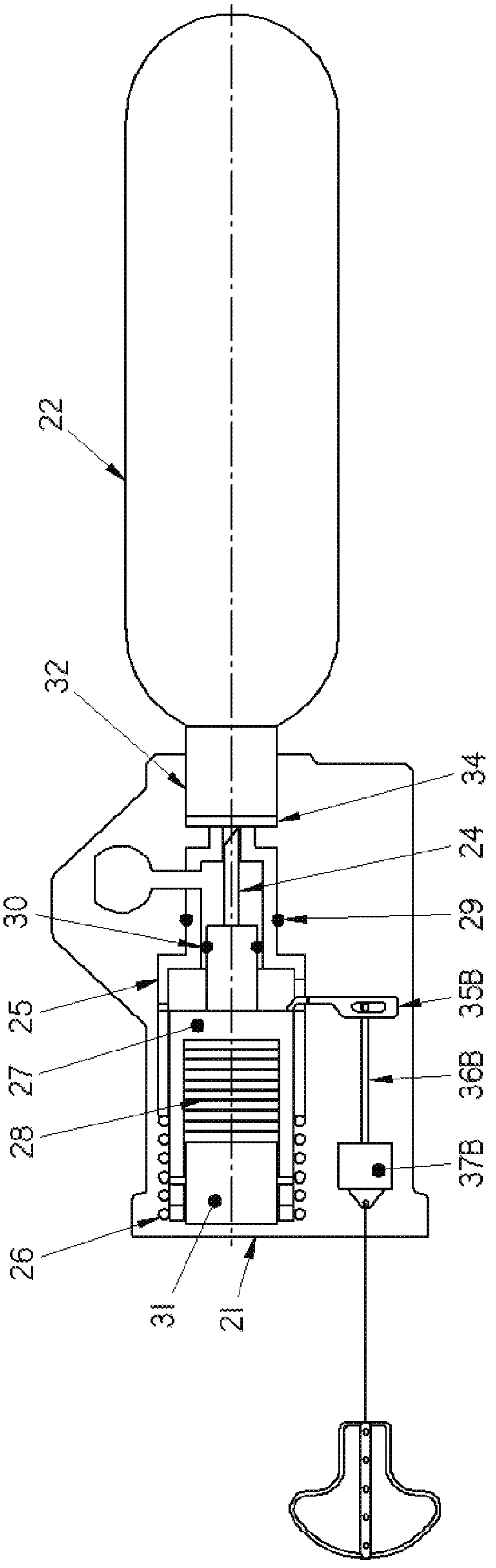
FIG. 5 shows the inflator with a solenoid in addition to the manual release cord in the pre-inflate position.

In a third embodiment, shown in FIG. 5, the solenoid module 37B is remote from the pin and the actuating link 36B attaches to the slide pin 35B. The other components of the inflator remain as described above and are numbered accordingly.

Figure 6:
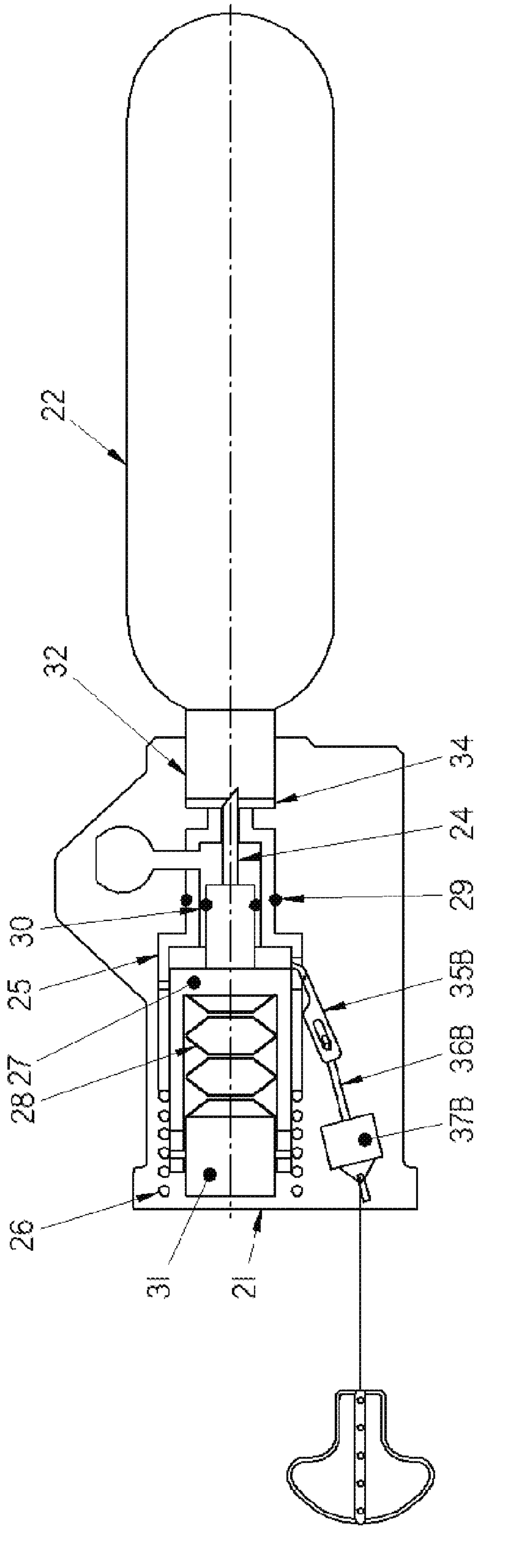
FIG. 6 shows the solenoid triggered to move the pin from its blocking position, thus allowing the pin removal and the advance of the inner body and the piercing pin.

FIG. 6 shows the actuation of the inflation in the third embodiment when solenoid 37B is actuated by a manual pull and this results in the pin 35B being pulled from its previous blocking position by action of the link 36B. This releases the disc springs 28 to drive the inner cylinder 27 and the penetrator pin 24 through the membrane 34 of the gas cylinder 22, thus releasing the gas in the cylinder and inflating a bladder.

Figure 7:
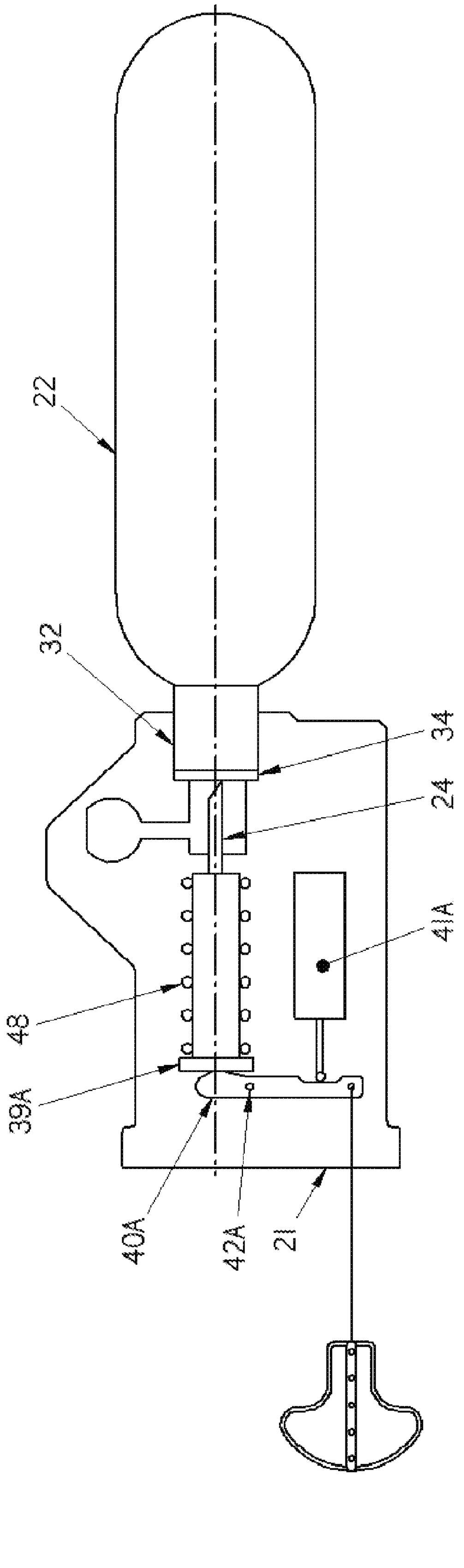
FIG. 7 shows an alternate actuating means.

FIG. 7 shows a fourth embodiment with yet another location and set of linkages for the inflator. The manual operation in this embodiment is separated from the solenoid action with a link/actuator lever 40A, which is used to manually push the penetrator pin assembly 24 against the force of spring 48, which are exerting force against restraint 39A. A solenoid 41A also can actuate the link/actuator lever, pushing it against a pivot point 42A to compress the springs and allow the penetrator pin to break the gas cylinder seal.

Figure 8:
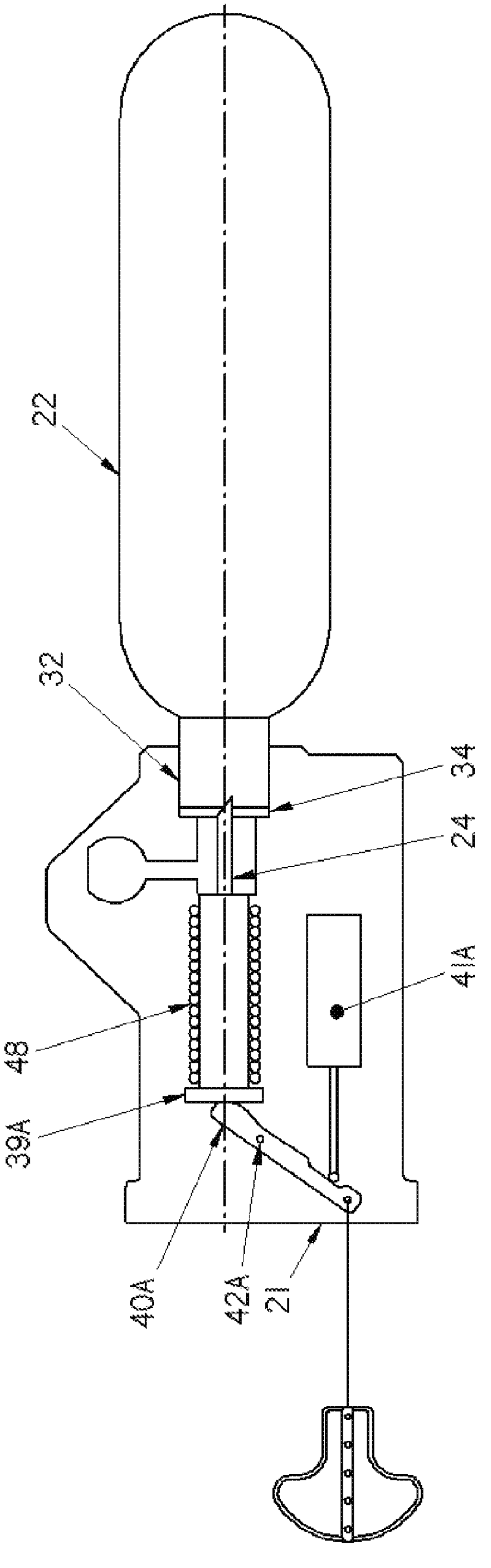
FIG. 8 shows the inflator in the inflate position having pierced the $CO_2$ retaining membrane.

FIG. 8 shows the configuration in FIG. 7 actuated by the solenoid valve where the link/actuator lever is displaced to drive the penetrator pin through the gas cylinder membrane for this fourth embodiment.

In a fifth embodiment, a further improvement uses dual water sensors, which are placed apart within the inflator housing. By physically separating the water sensors using series connections, both sensors must be wet before the inflation cycle is initiated, thus preventing inadvertent or accidental splashes or dampness from actuating the inflator.

In a sixth embodiment, the water sensors of the fifth embodiment are external to the housing of the inflator and plug into the inflator electronics to start automatic inflation as needed.

Figure 11:
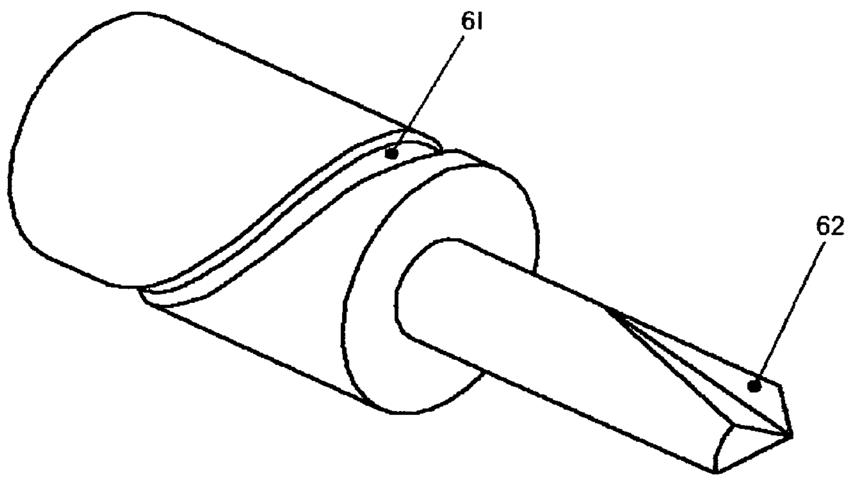
FIG. 11 shows the outside of the inner body with a spiral groove that would interact with a pin or ball causing the piercing pin portion to rotate as it advances thus causing a rotary cutting action by the piercing pin. The spade tip of the penetrator is also shown, given that, with the rotation, such a tip greatly expands the open area created in the gas cartridge sealing membrane.

In a seventh embodiment, the action of the penetrator pin is further enhanced by imparting a twisting or rotary motion to the penetration pin through a groove in the inner cylinder as shown in FIG. 11. The spiral groove 61 engages with a projection in the housing of the inflator and provides a rotary motion as the pin advances.

In an eighth embodiment, the penetrator pin has a spade or flat end at the tip of the pin that contacts the membrane of the gas cylinder, indicated in FIG. 11 as element 62.

Figure 13:
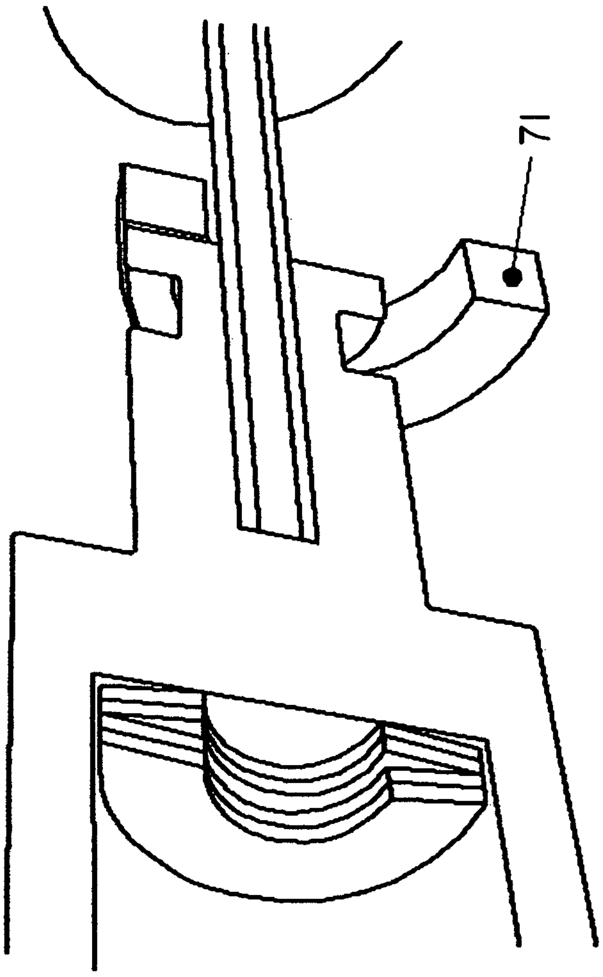
FIG. 13 shows an alternate restraint on the inner body motion.
Figure 14:
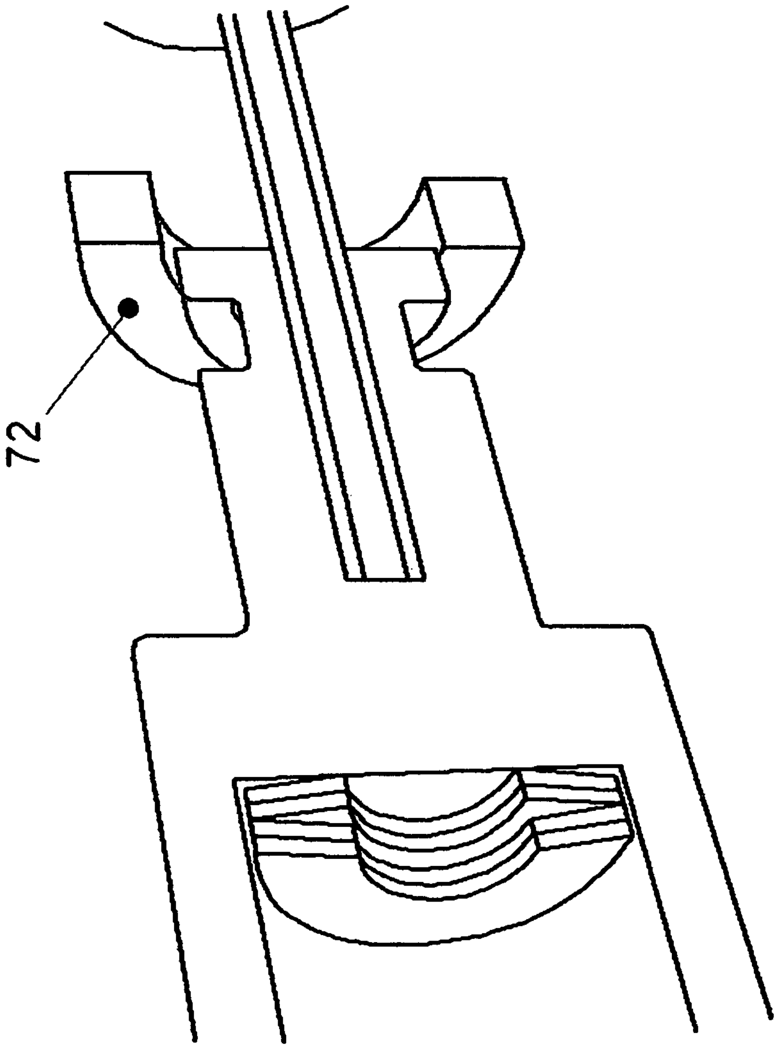
FIG. 14 shows where the inner body obstruction is removed by displacing the inner body within a restraining ring.

In a ninth embodiment the pin, indicated in FIG. 3 as element 33, and in FIG. 5 as element 35B, is replaced by offsetting the penetrator pin or its housing against a stop 71 that is part of the housing of the inflator as shown in FIG. 13. When the penetrator pin is moved to the center of the sleeve 72, forward motion is enabled and the pin advances to penetrate the membranes of the gas cylinder as shown in FIG. 14.

In another embodiment, the inflator for filling a bladder or other container with gas (such as a cartridge) is placed within a device that has a manually advanceable penetrator within a penetrator housing. The compressed disc springs can be actuated by an electronic signal and can alternately advance an inner cylinder body with spring displacement. An inner cylinder body is coupled by coupling means to the penetrator. This inner cylinder body may alternately independently advance the penetrator and thereby cause the penetrator to penetrate sealing means in the cartridge. This releases the compressed gas in the cartridge.

It should be noted that the coupling means can be a collar around at least a portion of the penetrator. The collar interacts with the inner cylinder body of the mechanism.

It should further be noted that the coupling means can also be a change in diameter of the penetrator. This change in diameter interacts with the inner cylinder body of the actuator mechanism and causes the penetrator to advance towards the sealing means.

While specific configurations are discussed and revealed as embodiments, the words used herein should not be construed in a broader context than the text permits. All sizes, sensors and combinations that are part of the technology disclosed herein that permits the use of disc springs, improved water sensing procedures, penetration pins, and the electronics indicated, and all items to which a practitioner may find similar substitutes, lie within the disclosures made here. The application of the broad concepts herein as modified versions is included within the broad concept of this invention.

I claim:

1. An inflator mechanism, the mechanism comprising:

a penetrator for piercing a membrane of a gas bottle;

at least one disc spring for propelling said penetrator toward said membrane;

a restraining pin for restraining said penetrator;

wherein said at least one disc spring is compressed when said penetrator is restrained by said restraining pin;

when said restraining pin is removed, said penetrator is released and is propelled to pierce said membrane;

when said membrane is pierced, inflation gas escapes from said gas bottle; and when said penetrator is released, said penetrator undergoes a rotary motion as said penetrator advances towards said membrane.

2. The mechanism according to claim 1, wherein said mechanism further comprises at least two water sensors, each of said water sensors being required to be submerged in a liquid before said sensors send a water sensor signal to a microprocessor which causes said microprocessor to send a command which causes said penetrator to be released.

3. The mechanism according to claim 1, wherein said restraining pin is manually retractable by a user to release said penetrator.

4. The mechanism according to claim 1, further comprising at least one pressure sensor, said pressure sensor having a user configurable setting for a trigger pressure such that when said trigger pressure is detected by said pressure sensor, said pressure sensor causes a microprocessor to send a command which causes said penetrator to be released.

5. The mechanism according to claim 1, wherein said penetrator is a piercing pin.

6. The mechanism according to claim 2, wherein when said microprocessor determines that said at least two sensors are submerged by said liquid by way of said water sensor signal, said microprocessor sends said command which causes a solenoid coupled to said restraining pin to become energized, thereby causing said restraining pin to be retracted and to thereby release said penetrator.

7. The mechanism according to claim 4, wherein detection of said trigger pressure by said pressure sensor causes said pressure sensor to send a pressure signal to said microprocessor, said pressure signal causing said microprocessor to send a command which causes a solenoid coupled to said restraining pin to become energized, thereby causing said restraining pin to be retracted and to thereby release said penetrator.

8. The mechanism according to claim 7, further comprising at least two water sensors, each of said water sensors being required to be submerged in a liquid before said penetrator is released, submersion of both of said water sensors causing said water sensors to send a signal to said microprocessor to cause said to send said command which causes said solenoid to become energized, thereby causing said restraining pin to be retracted and to thereby release said penetrator.

9. The mechanism according to claim 8, wherein said microprocessor sends said command which causes said solenoid to become energized only after receiving said signal from both said at least one pressure sensor and said at least two water sensors such that said penetrator is released only after said trigger pressure has been detected by said pressure sensor and after said at least two water sensors are submerged.

10. The mechanism according to claim 1, further including a solenoid mechanically coupled to said restraining pin such that energizing said solenoid retracts said restraining pin to thereby release said penetrator.

11. The mechanism according to claim 1, wherein said rotary motion comprises said penetrator rotating about its longitudinal axis as said penetrator is propelled to pierce said membrane.

12. The mechanism according to claim 11, wherein an inner cylinder coupled to said penetrator cooperates with a housing to cause said penetrator to rotate about its longitudinal axis when said penetrator is propelled to pierce said membrane.

13. The mechanism according to claim 3, wherein a pulling force of between 5 and 15 lbs. is required from said user to retract said restraining pin from restraining said penetrator.

14. The mechanism according to claim 2, wherein submersion of said two water sensors causes said microprocessor to send a command which causes a solenoid coupled to said restraining pin to become energized, thereby causing said restraining pin to be retracted and to thereby release said penetrator.

15. The mechanism according to claim 14 further comprising at least one pressure sensor for sensing a trigger pressure, wherein when said trigger pressure is sensed by said at least one pressure sensor, said at least one pressure sensor causes said at least one pressure sensor to send a signal to said microprocessor, said signal causing said microprocessor to send said command which causes said solenoid to become energized, thereby causing said restraining pin to be retracted and to thereby release said penetrator.

16. The mechanism according to claim 15, wherein said microprocessor sends said command which causes said solenoid to become energized only after receiving said signal from both said at least one pressure sensor and said at least two water sensors such that said penetrator is released only after said trigger pressure has been detected by said pressure sensor and after said at least two water sensors are submerged.

17. The mechanism according to claim 16, wherein said trigger pressure is set by a user, said trigger pressure corresponding to a depth at which said at least one pressure sensor sends said signal to said microprocessor to cause said microprocessor to send said command which causes said solenoid to become energized.

18. The mechanism according to claim 1, wherein said mechanism comprises a function selector which determines which signals cause a microprocessor to send a command that causes a solenoid coupled to said restraining pin to become energized, thereby causing said restraining pin to be retracted and to thereby release said penetrator.

19. The mechanism according to claim 18, further comprising a lever which, when pulled by a user, causes said restraining pin to be retracted, thereby releasing said penetrator.

20. The mechanism according to claim 18, wherein said function selector has three settings, said three settings corresponding to:

a hydrostatic setting, wherein when said function selector is set to said hydrostatic setting, said microprocessor sends said command that causes said solenoid to become energized only when at least one pressure sensor sends a signal to said microprocessor indicating that said pressure sensor has been submerged to a preset depth;

a manual setting, wherein when said function selector is set to said manual setting, said microprocessor only gathers data and does not send said command that causes said solenoid to become; and an automatic setting, wherein when said function selector is set to said automatic setting, said microprocessor sends said command that causes said solenoid to become energized only when at least two water sensors send a signal to said microprocessor indicating that said at least two water sensors are submerged in liquid.

* * * * *